J. YGLESIAS.
Improvement in Breech-Loading Fire-Arms.
No. 114,742. Patented May 9, 1871.
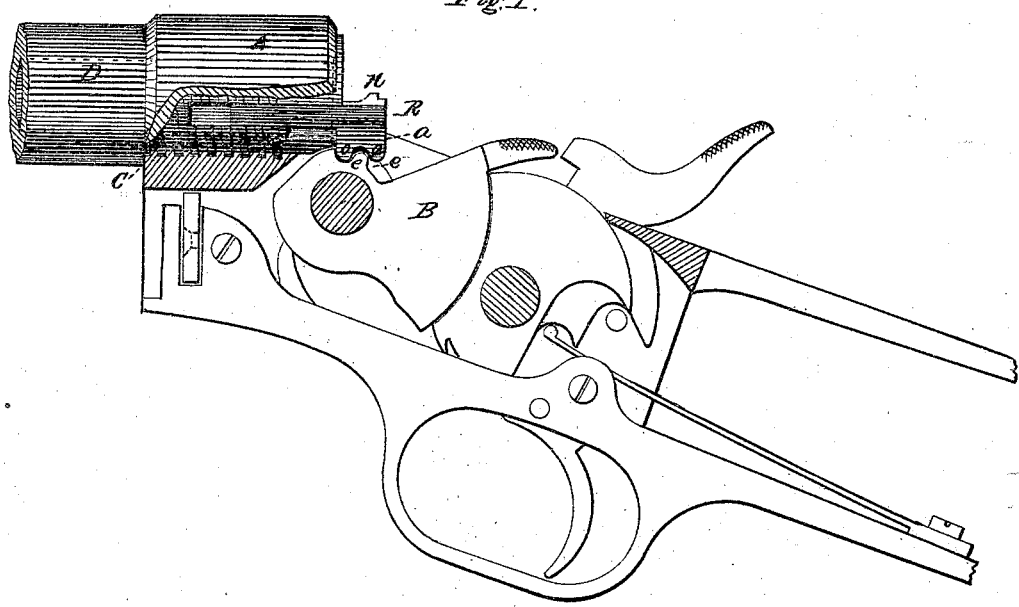
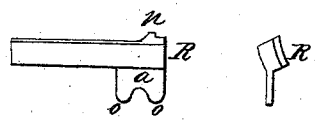
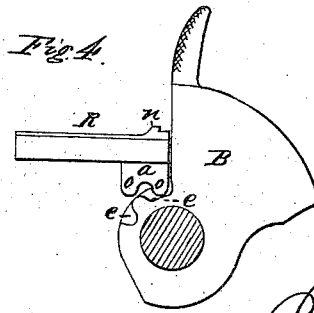

United States Patent Office.

JOSE YGLESIAS, OF NEW YORK, N. Y.

Letters Patent No. 114,742, dated May 9, 1871.

IMPROVEMENT IN BREECH-LOADING FIRE-ARMS.

The Schedule referred to in these Letters Patent and making part of the same.

*To all whom it may concern:*

Be it known that I, JOSE YGLESIAS, of New York, in the county of New York and State of New York, have invented certain Improvements in Breech-Loading Guns, of which the following is a specification, reference being had to the accompanying drawing.

My invention relates to the means used for withdrawing the shell or cases of cartridges used in breech-loading guns; and The invention consists in providing the retractor with a series of teeth, and the hub of the breech-block with a corresponding series of recesses for the teeth to engage in, all as hereinafter more fully explained.

Figure 1 is a side elevation of the breech mechanism of a gun, with the front side removed to show the improvement;

Figure 2 is a side view; and

Figure 3 an end view of the retractor, shown detached.

Figure 4 is a side view of the retractor and breech-block in the position they occupy when the breech is closed.

The drawing, fig. 1, represents a well-known style of breech-loading gun, in which the breech-block B is pivoted to the frame A at the rear end of the barrel D, and is opened by being swung backward on its axis.

As heretofore made, this style of gun has had a retractor resembling the one here shown in its general appearance, it consisting of the piece R, fitted to slide in a groove, C, cut in the exterior of the barrel, where the latter is screwed into the frame, as shown in fig.

As previously made, however, the retractor R had a small projection on its under side, which fitted into a recess cut in the side of the hub of the breech-block, the recess being of considerable length, and its front shoulder, as it comes in contact with the projection, operating to draw the retractor back. As, however, the projection on the retractor moved in a straight line while the shoulder that operated it moved in a circle, it followed that the shoulder tended to move away from the projection and to slip off from it, whereby the movement of the retractor was necessarily very limited.

To remedy this difficulty I construct the retractor with a projecting lip or web, $a$, on which I form two or more teeth, $o$, as shown in figs. 1, 2, and 4.

On the hub of the breech-block I form a corresponding series of teeth, between which are recesses $e$, into which the teeth $o$ of the retractor fit.

When thus constructed it will be seen that, as the breech-block B is opened or swung back its teeth will engage with those of the retractor R, and thus draw the latter back, the lip or shoulder $n$ of the retractor C engaging against the front side of the flange of the cartridge, and thereby pushing it out of the chamber of the gun. As the breech-block is closed the teeth also push the retractor in again until it is almost to its seat, when the breech-block striking it carries it entirely home.

It will be observed that by this improvement the retractor can be moved a greater distance, and that as the successive teeth come into operation there is no tendency for it to become disengaged from the block.

It will also be seen that the retractor begins to move much sooner, both in opening and closing, than when constructed on the old plan, it only being carried home by the contact of the breech-block with its rear end. By this means I dispense with nearly all the lost motion which necessarily occurred with the old plan.

I am aware that guns have been made in which a segmental rack has been attached upon the outside of the barrel to operate the retractor; also, that a similar rack has been used in connection with a tipping-barrel, and therefore I do not claim such; but What I do claim is—

The swinging breech-block B, having its hub provided with a series of recesses, $e$, in combination with the retractor R having a corresponding set of teeth, $o$, when constructed and arranged to operate as herein described.

JOSE YGLESIAS.

Witnesses:
 AMORY EDWARDS,
 G. W. HEBARD.